F. E. BASH.
OPTICAL PYROMETRIC METHOD AND APPARATUS.
APPLICATION FILED MAR. 29, 1919.
1,362,281.
Patented Dec. 14, 1920.
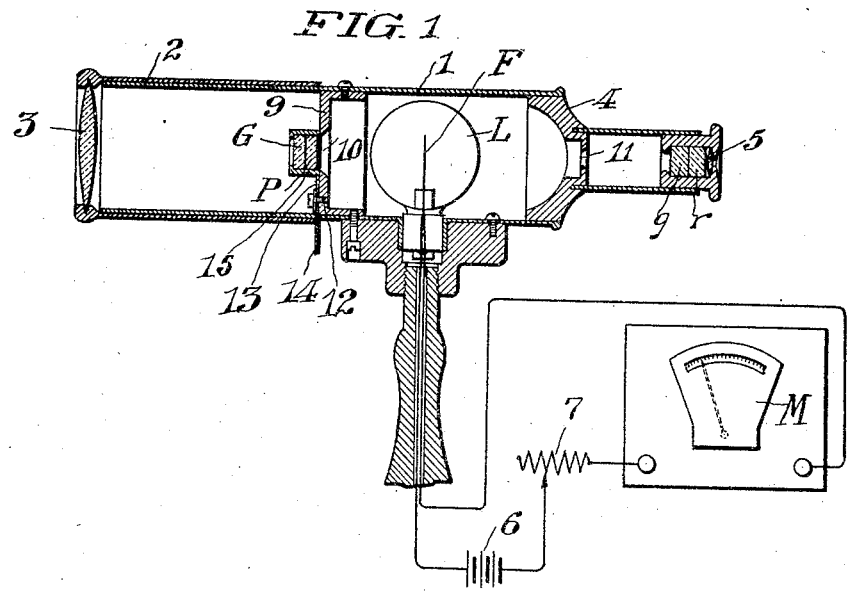
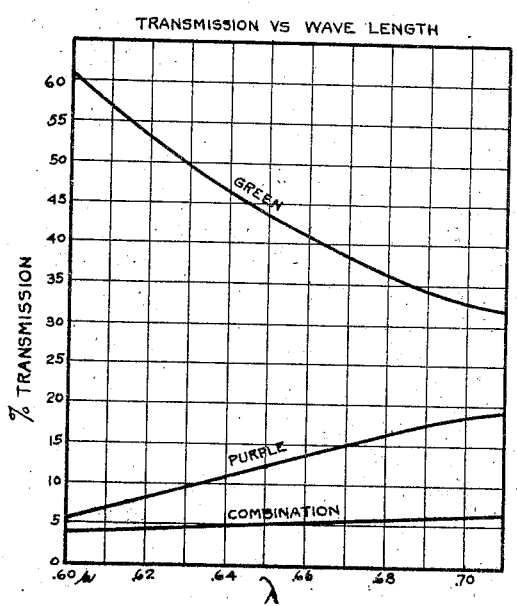
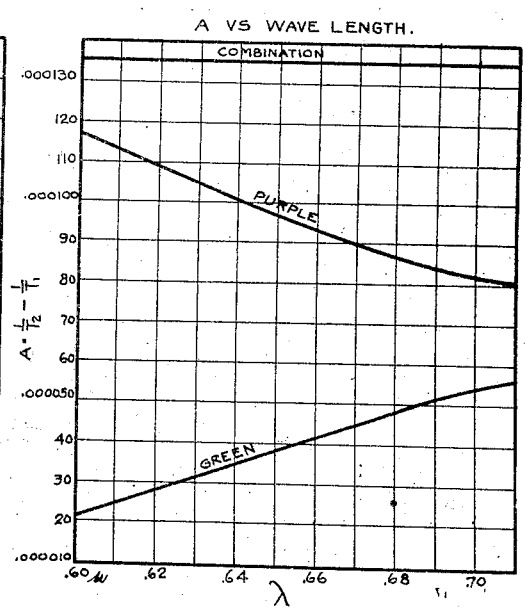
INVENTOR
Francis E. Bash
BY
Cornelius D. Ehret
his ATTORNEY.

UNITED STATES PATENT OFFICE.

FRANCIS E. BASH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

OPTICAL PYROMETRIC METHOD AND APPARATUS.

1,362,281.   Specification of Letters Patent.   Patented Dec. 14, 1920.

Application filed March 29, 1919. Serial No. 285,975.

*To all whom it may concern:*

Be it known that I, FRANCIS E. BASH, a citizen of the United States, residing in the city and county of Philadelphia, State of Pennsylvania, having invented certain new and useful Improvements in Optical Pyrometric Methods and Apparatus, of which the following is a specification.

My invention relates to an optical pyrometric method and apparatus characterized by the employment in well known manner for the measurement of high temperatures of a standard of illumination, as an incandescent lamp filament, flame or equivalent, whose brightness is matched with the brightness of light transmitted from the glowing body whose temperature is to be determined through a light absorbing structure or screen, the brightness of the standard serving when a match is attained as an indication or measure of the temperature of the glowing body.

My invention resides in a method of optical pyrometry of the character referred to wherein the light emitted by the glowing body and having components of many colors or wave lengths is selectively transmitted through a color selective or unneutral absorption screen in such manner that the percentage of transmission of the absorption screen increases proportionately with increase in wave length, particularly within a range of wave lengths of which the ocular absorption screen between the light standard and the eye is selective; and in such manner that for all absolute temperatures of the body whose temperature is to be measured requiring the use of an absorbing screen, the reciprocal of the absolute temperature minus the reciprocal of the apparent temperature or temperature of a light standard as affected or determined by the absorbing screen, is constant.

My invention resides in optical pyrometric apparatus of the character referred to wherein the absorption screen interposed between the light standard and the body whose temperature is to be measured has the above mentioned characteristics, whereby not only a brightness match, as usual in optical pyrometry, is possible between the light source and the light transmitted through the absorption screen, but also a color match is attained. For the absorption screen may be used an unneutral colored glass of suitable characteristics, or an unneutral or colored glass in combination with a substantially neutral light absorbing glass or other means; my preferred combination comprises, however, an unneutral or colored glass of suitable characteristics in combination with another unneutral colored glass of suitable compensatory characteristics.

In optical pyrometry it has heretofore been the practice to employ an incandescent electric lamp or other light source in association with an eye-piece and an absorption screen between the lamp filament and the body whose temperature is to be measured, the screen serving as a means for increasing the range of the instrument beyond the temperatures at which it would be possible, desirable or safe to run the lamp filament in the absence of the absorption screen.

So far as I am aware, with the absorption screens heretofore employed in the relation above described, it has been necessary for procuring the calibration for the high temperature range of the pyrometer necessitating the use of the absorbing screen, to make experimental determinations respecting the absorbing screen and thereafter make involved calculations, due to the fact that the A value of the screen varied with temperature.

In accordance with my invention, however, because of the proportionality between increasing transmission of the absorption screen and increasing wave length, and because of the constancy of the so-called A value of the screen, I am enabled more easily to calibrate an optical pyrometer of the character referred to for all temperatures above that necessitating the use of the screen, by simple determination and calculation from the temperature-brightness characteristics of the incandescent lamp or other standard used.

With optical pyrometers heretofore employed, so far as I am aware, in measuring high temperatures, particularly above approximately 2800 degrees F., a color match between the lamp filament or other standard with the light from the hot body passing through the absorption screen, has not been possible, with resultant introduction of error in temperature measurements due to judgment or characteristics of the eye of the observer, due to the fact that the lamp filament would not, though at the same brightness, in effect merge into the field illuminated by the transmitted light. By my absorption screen, however, a color match in addition to the match in brightness, is available throughout the high temperature range of the instrument.

For an understanding of my invention reference is had to the accompanying drawing, in which:

Figure 1 is in part a sectional view and in part a diagrammatic view of connections of one of many forms of pyrometric apparatus in which my invention may be embodied.

Fig. 2 is a graphic representation of optical characteristics of my absorption screen.

Fig. 3 is a further graphic representation of optical characteristics of my absorption screen.

Referring to Fig. 1, 1 and 2 are telescopic tubes. At the front end of the tube 2 is mounted the objective lens 3. The tube 1 is closed at its rear end by the member 4 supporting the eye piece structure having the ocular lens 5 in front of which are disposed colored glass screens $r$ and $g$. Suitably disposed within the tube 1 is the incandescent lamp L having the filament F connected in circuit with the battery or source of current 6, rheostat or adjustable resistance 7 and the D'Arsonval or other galvanometer or ammeter M whose scale, generally in two ranges, may have a total range from 1200 to 6500 degrees F., or higher.

Between the lamp L and the objective 3 is disposed the member or diaphragm 9 having the aperture 10 in the optical axis of the instrument, in which axis also is the aperture 11 adjacent the eye piece structure.

Upon the member 9 is pivoted at 12 the lever 13 having a handle 14 extending to the exterior of the telescope structure. At its inner end the lever 13 carries the holder 15, in which are disposed the absorption screen elements G and P, which may be, for example, and preferably, clear, non-opalescent unneutral glasses colored, respectively, blue-green and purple. The screen is removable from operative position illustrated by actuating the lever handle 14, as when relatively low temperatures are to be measured.

The apparatus described is used as well understood in the art by sighting through the telescope upon the incandescent body whose temperature is to be measured. Light from the body passes through the objective 3 through the absorption screen elements G and P and then with light from the filament F passes through the ocular screens $g$ and $r$ and lens 5 to the observer's eye. The rheostat 7 is adjusted until the brightness of the filament F matches with the brightness of the illuminated field due to light from the incandescent body transmitted through the absorption screen. The temperature then becomes known by reading the deflection of the meter M whose scale readings depend upon the characteristics of the particular lamp filament F employed.

When an absorption screen is employed between the lamp filament and the object whose temperature is to be measured, the temperature of the filament F corresponding with a brightness match is the apparent temperature of the hot body; its real temperature is, however, higher, and is the temperature of the filament F increased by an amount dependent upon the transmission characteristics of the interposed absorption screen. The high range calibration of the apparatus, and particularly of the meter M, is therefore dependent upon the transmission characteristics of the absorption screen. Such high range calibration can be calculated or determined from the low range calibration, that is, the calibration of the filament F itself where no interposed screen is employed, only when the transmission characteristics of the interposed screen are known.

In the case of an incandescent or glowing body which is a so-called perfect radiator, that is, which has "black body" characteristics, and where an absorption screen intervenes between the black body and the light standard, as the lamp filament, the relation between the transmission of the screen, wave length of light, the true and apparent absolute temperatures, is given by Wien's law, which is as follows:

$$J = C_1 \lambda^{-5} e^{-\frac{C_2}{\lambda T}}$$

in which—

J is the energy radiated from a black body for wave length $\lambda$ and absolute temperature T.

$C_1$ is a contant.

$\lambda$ is the particular wave length selected.

$e$ is the base of the Napierian logarithms.

$C_2$ is a constant=14,500.

T is the absolute temperature of the black body.

If a hot black body is viewed through an absorption screen and a black body lamp filament is matched against its brightness, the energy from the lamp filament at temperature $T_1$ and hot body at temperature $T_2$ by Wien's law will be:—

$$J_1 = C_1 \lambda^{-5} e^{-\frac{C_2}{\lambda T_1}}$$

for the lamp filament and $$J_2 = C_1 \lambda^{-5} e^{-\frac{C_2}{\lambda T_2}}$$

for the hot body.

At a match the transmission $Tr$ of the absorption screen will be the ratio of the two energies $J_1$ and $J_2$ or $$Tr = \frac{J_1}{J_2} = \frac{C_1 \lambda^{-5} e^{-\frac{C_2}{\lambda T_1}}}{C_1 \lambda^{-5} e^{-\frac{C_2}{\lambda T_2}}}$$

from which $$Tr = \frac{e^{-\frac{C_2}{\lambda T_1}}}{e^{-\frac{C_2}{\lambda T_2}}}$$

and $$\text{Log } Tr = -\frac{C_2}{\lambda T_1} \text{Log} \cdot e + \frac{C_2}{\lambda T_2} \text{Log } e$$

or $$\text{Log } Tr = \frac{C_2 \text{Log } e}{\lambda}\left(\frac{1}{T_2} - \frac{1}{T_1}\right)$$

If monochromatic light or light of single wave length is used, $\lambda$ is constant and the following relation obtains:—

$$\frac{1}{T_2} - \frac{1}{T_1} = A,$$

which is a constant.

The employment of monochromatic light or light of a single wave length, which might be obtained by passing the light from the black body through a prism and choosing any particular wave length, is undesirable because the amount of light reaching the eye of the observer will be a very small percentage of the total light radiated by the black body and will be too small in amount for the low temperature ranges. Accordingly, it has been customary to employ in connection with the eye piece of the instrument, as at $r$ or $g$, or both, clear colored glass, which is accordingly selective and transmits only light of small range in wave lengths. Red glass is generally employed, since it predominates in the light from a glowing body particularly at the lower temperatures, and thus makes possible a wide range for the pyrometric instrument.

As a black body increases in temperature, the effective wave length of the light radiated therefrom shifts toward the blue end of the spectrum, and since the eye piece or ocular screen is not truly or exactly monochromatic, but transmits a range of wave lengths of light, the effective wave length of the light passing through both the absorbing screen and the ocular screen changes with rise in temperature of the black body.

By the term "effective wave length" as herein employed is intended and meant the abscissa value of the center of gravity of the area bounded by the axis of abscissæ and the curve whose abscissæ values are wave lengths and whose ordinates are values of luminosity divided by wave length.

From Wien's law it is therefore apparent that, since the value of $\lambda'$, the effective wave length, varies with rise in temperature, the value of the factor $$\frac{1}{T_2} - \frac{1}{T_1}$$

is not constant, but has a magnitude which varies in dependence upon the transmission characteristics of the absorbing screen. In consequence, it is impossible accurately to extrapolate or determine by calculation the high range calibration of the instrument by determining the transmission of the absorbing screen at one temperature, unless it be known how $\lambda'$ varies with the temperature. And because the transmission of the absorbing screen varies with temperature, due to shifting of effective wave length, it is also impossible to determine at or for one temperature the value of A for each of two unneutral screens, as screens of colored glass, to calculate their joint absorption by adding their respective A values.

For very high temperature measurements two absorbing screens are sometimes required in order that the lamp filament or other source may be worked within its usual or safe temperature range. For such purpose it is highly desirable that the two absorbing screens employed may be of such optical characteristics that their A values may simply be added in order to determine the transmission through them in series from the incandescent black body. Two screens are so employed because of difficulty in determining the transmission of an absorbing screen of high absorption at low temperatures, such as those at which it is safe or necessary to operate the lamp filament or other source. On the other hand, the transmission of a low absorption screen is readily determined; therefore, if two such low absorption screens be employed, if they are of such characteristics that their A values may be added, high range calibration becomes a simple matter.

These difficulties are overcome by my absorbing screen whose components have such characteristics that placed in series the A value of the combination throughout a range of wave lengths is constant and is the sum of their A values at the various wave lengths.

Two of my complete screens when serially related have a combined A value which is the simple sum of their respective A values.

Furthermore, my absorbing screen has the characteristic of transmission diminishing proportionately to diminishing wave length, so that as the effective wave length shifts with rise in temperature of the black body toward the blue end of the spectrum, the transmission of the screen diminishes in such manner that a color match is attainable even at the highest temperatures.

Color match is procured when the effective wave length reaching the eye from the incandescent body through the transmission screen coincides with the effective wave length of the light from the filament at matching brightness. The use of an ocular screen affects both similarly, and therefore whether or not an ocular screen is employed, a color match is obtained. This is accomplished in accordance with my invention because with rising temperature of the hot body the effective wave length of light therefrom becomes shorter, and with shorter effective wave length the transmission of my absorbing screen becomes less for that wave length, but its total transmission for all wave lengths increases, and when the filament is brought to a brightness match dependent upon the total transmission through the absorbing screen, the effective length of the light from the filament is the same as the effective wave length transmitted from the hot body through the absorbing screen. This accords with the expression $$\text{Log } Tr = \frac{(C_2 \text{ Log } e) A}{\lambda'}$$

in which $\lambda'$ is the effective wave length of the light transmitted through my absorbing screen, and $Tr$ is the total transmission for the same hot body temperature, upon which total transmission depends the temperature or brightness to which the lamp filament must be brought for match in brightness.

In the foregoing algebraic expression, with varying effective wave length $\lambda'$ the logarithm of the total transmission may be made to vary in such manner that the product of the effective wave length into the logarithm of the total transmission is a constant. This is true in the relation in which my screen is employed, and this relation cannot obtain unless the A value of the absorbing screen is a constant, which is a characteristic of my screen.

These optical characteristics of my screen will be understood by reference to Figs. 2 and 3.

In Fig. 2 ordinates are percentages of transmission and abscissæ wave lengths or values of $\lambda$.

In the eye piece there is assumed to be used a red glass screen, as $r$, or a number of them. This ocular screen or combination of ocular screens will selectively transmit red light, for example, of wave lengths .60 to .70 micron. With such an ocular screen or combination I may and preferably do employ an absorbing screen G, P, Fig. 1, of clear non-opalescent blue-green and purple glasses. The upper curve in Fig. 2 is the transmission-wave length curve of the green grass employed, while the middle curve is the transmission-wave length curve of the associated purple glass; and the lower or third curve is the transmission-wave length curve of the combined green and purple glasses, resulting from the multiplication of the transmissions of the two glasses at each wave length. This third curve is to all intents and purposes a straight line whose slope or angle between itself and the X axis is relatively small. Its slope will be increased by increasing the relative amount of purple glass employed in the combination. The curves in Fig. 2 are for definite thicknesses of each of the green and purple glasses, but for other proportions the third curve for the combination will nevertheless be a straight line. The slope of the combination curve may be made anything suitable or desirable and is made such that the transmission of the combination of green and purple glasses decreases at suitable rate with decreasing wave length, at least within the range of the wave lengths indicated. Because of this decrease in transmission, with rise in temperature of the black body, which is accompanied, as previously explained, by a shifting of the effective wave length toward the blue end of the spectrum, the transmission of the combined green and purple glasses compensates for the effect of such wave length change with temperature rise, and the color of the field against which the filament F is to be matched becomes such that a perfect color match between filament and field is possible through the high temperature range. From this follows reduction of errors on the part of the observer, and in fact a color-blind person can make as accurate measurements of temperature as a person having a normal eye, since color match is automatically obtained and brightness match is readily made.

In Fig. 3 ordinates are A values in $$\text{Log } Tr = \frac{A(C_2 \text{ Log } e)}{\lambda}$$

that is, values of $$\frac{1}{T_2} - \frac{1}{T_1},$$

while abscissæ are again values of $\lambda$ or wave lengths of the same range as in Fig. 2.

The lower curve is that of the green glass referred to in connection with Fig. 2; the middle curve is that for the purple glass referred to in connection with Fig. 2; the upper or combination curve is to all intents and purposes a straight line parallel with the X axis and results from the simple addition, at each wave length, of the ordinates of the purple and green glass curves. The significance of the curve of the combination is that for all wave lengths, particularly throughout the range at which the ocular screen is selective, the A value for the combination is constant. Therefore the purple and green glasses combined form an absorbing screen which compensates for wave length change accompanying changes in temperature and luminosity of the glowing black body. Two or more such absorbing screens placed in series, each consisting of purple and green glass of the characters referred to in connection with Figs. 2 and 3, will have a combined A value which is the sum of the A values of the two combinations, and therefore of the four component glasses.

In producing a screen of the improved characteristics above described due allowance is made, in well known manner, since the screen is to be used in air, for non-selective absorption for each component piece in the combination, regardless of its thickness.

Where two colored glasses, as purple and green above described, are used in combination for the absorbing screen, the ratio of thickness of the glass of one color to the thickness of the glass of the other color is always the same whatever the range of the pyrometric instrument or apparatus. With higher temperature ranges, however, thicker combinations are used; it generally is desirable, however, to use the thinnest combination consistent with the temperature range of the instrument.

By way of example merely, and without limitation of my invention thereto, it may be stated that with a red ocular screen, as Corning high transmission red, one combination of glasses for my absorbing screen comprehended within my invention consists of purple optical glass G 554 CP in series with blue-green optical glass G 171 IZ obtained from the Corning Glass Works, Corning, N. Y. A suitable ratio of thickness of the purple to the thickness of the green glass is 1.2. Obviously, however, for different melts of either or both of these types of glasses, or their equivalents, the thickness ratios may vary, but are readily determinable.

While I have referred more particularly to a combination of green and purple glasses, and to a certain wave length range for the ocular screen, it will be understood that my invention is not limited in these respects and that other than a red screen may be employed in the eye piece, and that other than green and purple glasses may be used in combination forming the associated absorbing screen.

For example, glasses of other colors than green and purple may be combined, so long as their variations of A values, with respect to wave length vary in such manner that their combination has a constant A value throughout a range of wave lengths, particularly the range of wave lengths of the associated ocular absorbing screen, if any be employed. It is a further feature of my invention broadly that the transmission-wave length characteristics of the screen elements so vary that the products of their transmissions at various wave lengths vary proportionately with wave length.

While by preference I employ two un-neutral or colored glasses, it will be understood that my invention comprehends also the employment of only one colored or un-neutral glass in combination with a substantially neutral glass.

While in general a red glass or glasses will be used as the absorbing screen in the eye piece structure, or generally, between the lamp filament and the observer's eye, a screen or screens of other color or colors may be employed. When employing a red ocular screen, there may be used in combination therewith a glass of green or other color. Whatever the color or thickness of such additional screen or other colored glass or glasses used in combination with the red ocular screen, the readings of the meter M will always be the same for the same temperature of the hot body. This for the reason that such additional green or other colored glass in the eye piece structure cuts down the light from the hot body and from the lamp filament without affecting the behavior of the main absorbing screen in association with the lamp filament and the red screen structure in the eye piece. With such combination the behavior of the instrument as affected by the main absorbing screen is not altered, it still being possible to produce the high temperature range calibration by extrapolation or calculation, to procure the color match, and in general to procure all the advantages inherent in employment of an absorbing screen of the described characteristics.

While I have referred to the absorbing screen as made up of a plurality of pieces of glass of different colors, it will be understood that a single piece of glass having therein the same proportions of the same colors is comprehended within my invention.

While I have herein referred to the absorbing screen or screen elements as constituted of glass, it will be understood that my invention is not limited in this regard, the term "glass" being used for the sake of brevity. For example, a vessel having transparent walls may contain suitably colored liquid in substitution for one or more of the colored glasses herein referred to.

While it has been hereinbefore assumed that a temperature of a black body is to be measured, it will be understood that the apparatus is suitable also for measuring temperatures of incandescent bodies which vary materially from black body conditions, suitable corrections in the readings of temperature being made in the same manner as heretofore practised. When the filament F is of carbon it also has black body characteristics, which have been assumed in the foregoing explanation of my invention. However, filaments of tungsten or other materials may also be employed and corrections for variations thereof from black body conditions may be made.

What I claim is:

1. In optical pyrometry, the method of measuring temperatures of an incandescent body throughout a temperature range, which consists in selectively absorbing light from a source to yield transmitted light, and adjusting the brightness of a standard to match the brightness of said transmitted light, the transmitted light having the characteristic throughout said temperature range that its effective wave length varying with temperature multiplied by the logarithm of the total transmitted light at each temperature is a constant whose magnitude is dependent upon the constant magnitude of difference between the reciprocal of the absolute temperature of said body and the reciprocal of the corresponding absolute temperature of said standard.

2. In optical pyrometric apparatus, light absorbing means whose A value is constant for different wave lengths of light.

3. In optical pyrometric apparatus, light absorbing means comprising serially disposed absorbing media at least one of which is unneutral and colored, the A value of said media being constant throughout a range of wave lengths of light.

4. In optical pyrometric apparatus, light absorbing means comprising absorbing members of different colors whose joint A value is constant throughout a range of wave lengths of light.

5. In optical pyrometric apparatus, light absorbing means comprising blue-green and purple absorbing members whose joint A value is constant throughout a range of wave lengths of red light.

6. Optical pyrometric apparatus comprising a light standard of predetermined temperature-brightness characteristic, and an absorbing screen disposed between said standard and the body whose temperature is to be measured and comprising unneutral colored light absorbing means whose A value is constant for different wave lengths.

7. Optical pyrometric apparatus comprising a light standard of predetermined temperature-brightness characteristic, an absorbing screen disposed between said standard and the light emitting body whose temperature is to be measured, and a red ocular screen, said absorbing screen comprising unneutral colored light absorbing means whose A value is constant for the different wave lengths transmitted through said ocular screen.

8. Optical pyrometric apparatus comprising a light standard of predetermined temperature-brightness characteristic, and an absorbing screen disposed between said standard and the body whose temperature is to be measured and comprising unneutral colored light transmitting members whose joint A value is constant for different wave lengths.

9. Optical pyrometric apparatus comprising a light standard of predetermined temperature-brightness characteristic, an absorbing screen disposed between said standard and the light emitting body whose temperature is to be measured, and a colored ocular screen, said absorbing screen comprising unneutral colored light transmitting members whose joint A value is constant for the wave lengths transmitted by said ocular screen.

10. Optical pyrometric apparatus comprising a light standard of predetermined temperature-brightness characteristic, an absorbing screen disposed between said standard and the light emitting body whose temperature is to be measured, and a red ocular screen, said absorbing screen comprising unneutral colored light transmitting members whose joint A value is constant for the wave lengths transmitted by said ocular screen.

11. Optical pyrometric apparatus comprising a light standard of predetermined temperature-brightness characteristic, an absorbing screen disposed between said standard and the light emitting body whose temperature is to be measured, and a red ocular screen, said absorbing screen comprising unneutral green and purple light transmitting members whose joint A value is constant for the visible wave lengths transmitted through said ocular screen.

12. Optical pyrometric apparatus comprising a light standard of predetermined temperature-brightness characteristic, an absorbing screen disposed between said standard and the light emitting body whose temperature is to be measured, and an ocular screen having components of different colors, said absorbing screen comprising unneutral colored light absorbing means whose A value is constant for the different visible wave lengths transmitted through the ocular screen.

13. Optical pyrometric apparatus comprising a light standard of predetermined temperature-brightness characteristic, an absorbing screen disposed between said standard and the light emitting body whose temperature is to be measured, and an ocular screen comprising components of different colors one of which is red, said absorbing screen comprising green and purple light transmitting members whose joint A value is constant for the visible wave lengths transmitted through said ocular screen.

14. Optical pyrometric apparatus comprising a light standard of predetermined temperature-brightness characteristic, and an absorbing screen disposed between said standard and the light emitting body whose temperature is to be measured comprising a plurality of screens each comprising un- neutral colored light absorbing means, the A value of each of said screens being constant for the same range of wave lengths, the joint A value of said screens being constant for the same range of wave lengths.

In testimony whereof I have hereunto affixed my signature this 24" day of March, 1919.

FRANCIS E. BASH.